United States Patent
Ji et al.

(10) Patent No.: US 12,465,562 B2
(45) Date of Patent: Nov. 11, 2025

(54) TRANSDERMAL DELIVERY COMPLEX USING METAL-ORGANIC FRAMEWORK AND TRIBLOCK COPOLYMER

(71) Applicant: H&A PHARMACHEM CO., LTD, Gyeonggi-do (KR)

(72) Inventors: Hong Geun Ji, Gyeonggi-do (KR); Young Ah Park, Incheon (KR); Hae In Choi, Incheon (KR); Yu Jin Kang, Gyeonggi-do (KR)

(73) Assignee: H&A PHARMACHEM CO., LTD, Gyeonggi-Do (KR)

( * ) Notice: Subject to any disclaimer, the term of this patent is extended or adjusted under 35 U.S.C. 154(b) by 801 days.

(21) Appl. No.: 17/419,384

(22) PCT Filed: Dec. 5, 2019

(86) PCT No.: PCT/KR2019/017102
§ 371 (c)(1),
(2) Date: Jun. 29, 2021

(87) PCT Pub. No.: WO2020/141741
PCT Pub. Date: Jul. 9, 2020

(65) Prior Publication Data
US 2022/0071882 A1 Mar. 10, 2022

(30) Foreign Application Priority Data
Dec. 31, 2018 (KR) .......... 10-2018-0173580

(51) Int. Cl.
| | | |
|---|---|---|
| *A61K 8/58* | (2006.01) | |
| *A61K 8/90* | (2006.01) | |
| *A61Q 17/04* | (2006.01) | |
| *A61Q 19/02* | (2006.01) | |
| *A61Q 19/08* | (2006.01) | |

(52) U.S. Cl.
CPC .............. *A61K 8/58* (2013.01); *A61K 8/90* (2013.01); *A61Q 17/04* (2013.01); *A61Q 19/02* (2013.01); *A61Q 19/08* (2013.01); *A61K 2800/52* (2013.01); *A61K 2800/58* (2013.01); *A61K 2800/82* (2013.01)

(58) Field of Classification Search
CPC ........ A61K 8/58; A61K 8/90; A61K 2800/52; A61K 2800/58; A61K 2800/82; A61K 31/216; A61K 2800/412; A61K 8/27; A61K 8/4946; A61K 9/0014; A61K 9/143; A61K 9/146; A61K 31/20; A61K 31/22; A61K 31/355; A61K 36/23; A61K 2800/57; A61Q 17/04; A61Q 19/02; A61Q 19/08; A61Q 17/005; A61Q 19/008; A61Q 7/00; A61P 17/00
See application file for complete search history.

(56) References Cited

U.S. PATENT DOCUMENTS

2010/0226991 A1  9/2010  Horcajada-Cortes et al.

FOREIGN PATENT DOCUMENTS

| JP | 2011-501739 A | | 1/2011 | |
|---|---|---|---|---|
| KR | 20160057189 A | * | 5/2016 | ............... A61K 8/49 |
| KR | 10-2016-0124398 A | | 10/2016 | |
| KR | 101663775 B1 | * | 10/2016 | ............... A61K 8/49 |
| KR | 10-2018-0021938 A | | 3/2018 | |

OTHER PUBLICATIONS

KR 20160057189 translated (Year: 2016).*
Zhou et al. (Selenium-containing polymer @ Metal-Organic Frameworks Nanocomposites as an Efficient Multi-responsive Drug Delivery System, Advanced Science News, 2017 (Year: 2017).*
KR 101663775 B1 translated (Year: 2016).*
Yao et al. (High-yield synthesis of zeolitic imidazolate frameworks from stoichiometric metal and ligand precursor aqueous solutions at room temperature, CrystEngComm, 2013 (Year: 2013).*
International Search Report from corresponding PCT Application No. PCT/KR2019/017102, dated Mar. 16, 2020.
Zhou, W. et al.; "Selenium-containing polymer@ metal-organic frameworks nanocomposites as an efficient multi responsive drug delivery system" Advanced Functional Materials. 2017. vol. 27, pp. 1-8.

* cited by examiner

*Primary Examiner* — Robert A Wax
*Assistant Examiner* — John Seungjai Kwon
(74) *Attorney, Agent, or Firm* — Harness, Dickey & Pierce, P.L.C.

(57) ABSTRACT

The present invention relates to a transdermal delivery complex using a metal-organic framework (MOF) and a triblock copolymer. In addition, the present invention relates to a cosmetic composition comprising the transdermal delivery complex and a method for preparing a transdermal delivery complex.

11 Claims, 7 Drawing Sheets

(a) Stirring at 25°C (b) Stirring at 40°C

TRANSDERMAL DELIVERY COMPLEX USING METAL-ORGANIC FRAMEWORK AND TRIBLOCK COPOLYMER

CROSS-REFERENCE TO RELATED APPLICATIONS

This application is a national phase application of PCT Application No. PCT/KR2019/017102 filed on Dec. 5, 2019, which claims priority to Korean Patent Application No. 10-2018-0173580, filed on Dec. 31, 2018. The entire disclosures of the applications identified in this paragraph are incorporated herein by reference.

TECHNICAL FIELD

The present invention relates to a composite for transdermal delivery in which a metal-organic framework (MOF) and a triblock copolymer are used.

In addition, the present invention relates to a cosmetic composition comprising the composite for transdermal delivery.

Furthermore, the present invention relates to a method for preparing the composite for transdermal delivery.

The present invention was accomplished under the support of the Korea Ministry of Trade, Industry and Energy, and project number of 10077704. The management agency of this project is the Korea Evaluation Institute of Industrial Technology, the study business name is material and parts technology development project (strategic core material development project), the project name is development of a composite material that can enhance skin permeability and control on/off release of functional physiologically active ingredients utilizing LDH and MOF, and the study period is from Apr. 1, 2017 to Dec. 31, 2019.

BACKGROUND ART

It is not easy to penetrate active ingredients of cosmetics into the skin. To stabilize an active ingredient and increase transdermal efficiency, effort and study for utilizing a transdermal delivery system (TDS) to functional cosmetics have been actively carried out. Because of developing functional materials, various functionalization methods for imparting higher stability to such materials have been widely studied.

The skin is always exposed to the external environment, and as an important organ to protect the body, it is the most important first line of defense that prevents the loss of body fluids and protects the body from harmful environments. That is, the skin suppresses the loss of water and electrolytes, provides a normal biochemical metabolic environment, and performs a barrier function that protects the human body from mechanical stimuli, ultraviolet rays and various microorganisms. The skin is largely divided into the dermis and the epidermis, and the dermis is in close contact with the subcutaneous fat underneath. The epidermis is a part of the epithelial tissue and consists of five cell layers: the basal layer, the spinous layer, the granular layer, the clear layer and the stratum corneum. The stratum corneum, which exists on the outermost part of the skin, is the primary barrier that performs a barrier function. After Elias et al. proposed a two-compartment model of plaster (keratinocyte interstitial lipid) and brick (keratinocyte), interest in the stratum corneum and the skin barrier has increased. That is, the stratum corneum has the shape of keratinocytes as if they were stacked with bricks, and it is the keratinocyte interstitial lipid that acts like a plaster which supports these keratinocytes. The stratum corneum is composed of about 40% protein, 40% water and 10 to 20% lipid, and its structure is composed of protein-rich keratinocytes and lipids filling the space therebetween. Among them, lipids in particular play a major role as the barrier. The stratum corneum contains a hydrophilic hygroscopic substance called natural moisturizing factor (NMF), which plays an important role in moisturizing the skin. The composition of NMF includes amino acids, pyrrolidone carboxylic acid, urea, ammonia, uric acid, glycosamine, creatinine, citrate, sodium, potassium, calcium, chlorine, magnesium, sugar, organic acid and peptide. In order to maximize the effect of the active ingredient, it can be easily penetrated deep into the skin when the size is smaller than or similar to 100 to 200 nm, which is between skin cell interstitial lipids.

Researches about the synthesis and properties of a substance known as a metal-organic framework (MOF) have been actively conducted. The metal-organic framework is a three-dimensional crystalline porous material formed by coordination of a secondary structural unit containing a metal ion or a metal cluster and an organic ligand. Up to now, thousands of metal-organic frameworks have been synthesized with the combination of metal secondary structural units and various organic ligand structures. Compared to conventional porous materials such as zeolite, activated carbon, silica and the like, the surface area of metal-organic frameworks is from 3 times to 7 times higher than that of conventional porous materials, and chemical functionalization is easier. As such, metal-organic frameworks have attracted attention as a new material to replace conventional porous materials.

MOF-5-which is a metal-organic framework synthesized by professor Omar M. Yaghi of the United States in 1999— is the first and representative metal-organic framework produced by coordinating between a 1,4-benzenedicarboxylic acid (BDC) organic ligand and a secondary structural unit of $Zn_4O$. In the same year, the Williams research group in Hong Kong also synthesized a new form of metal-organic framework, HKUST-1, by the combination of 1,3,5-benzenetricarboxylic acid and secondary structural units of $Cu_2(COOR)_4$. In the case of HKUST-1, after synthesis, the solvent is coordinated to the $Cu^{2+}$ metal, and when it is heat-treated under vacuum, an open-metal site (OMS) is formed. As a result, it acts like a Lewis acid and can interact with electron-rich chemical species (Lewis base), thereby making it useful for catalysts, gas separation and storage.

The Yaghi research group in the United States, which synthesized MOF-5, designed and synthesized various MOFs modified from the first reported MOF-5 structure using organic synthesis technology. By adjusting the length of the organic ligand, MOFs having structures similar to MOF-5 but having an enlarged void size were synthesized. In addition, by using organic ligands having various functional groups, various functional groups were successfully introduced into the MOF structure. The tailor-made synthesis strategy—in which the desired properties can be controlled from the design stage—can be said to be a very unique advantage, making MOF materials different from other porous materials.

The Ferey research group in France has been researching Cr- and Fe-based carboxylate MOFs and synthesizing the MIL series, and MIL-53 (trade name: Basolite A100), a coordination compound of Al and benzenetricarboxylate (H3BTC) has been studied as a catalyst and adsorbent. In addition, MIL-101 has been reported as a porous material with a large surface area of up to 5,900 $m^2/g$.

With the development of technologies in organic synthesis, organic ligands of various designs have been synthesized, and thousands of MOFs and various properties thereof have been reported by a combination of various metals and metal-clusters. The Hupp research group at Northwestern University in the United States has extended the length of organic ligands to synthesize a new form of MOF, Nu-110. A new ligand was designed through an experimental method and a computational chemical method, and Nu-110 was synthesized by reacting the new ligand with copper nitrate. The synthesized Nu-110 MOF has the largest surface area among the existing MOF materials, and its surface area is 7,100 $m^2/g$, which is a huge surface area that can cover all of an American football field with 1 g of MOF. This high surface area can serve as a great advantage when using MOF as a storage and separation of gases or as an energy storage. In the drug delivery system, it is a problem that the drug is rapidly decomposed before arriving at the target body tissue and its activity is lowered. Therefore, studies are being conducted to deliver drugs using a carrier to increase drug activity. In the case of using a carrier, it not only increases the stability of the drug, but also reduces the toxicity of the drug and increases the efficiency of the drug. As necessary conditions of the carrier for efficient drug delivery, a high loading amount, prevention of burst phenomenon and regulation of decomposition of the carrier are required. The nano-carriers reported to date include liposomes, nanoemulsions, nanoparticles, micelles, silica, etc., but these carriers did not meet the necessary conditions previously recited. According to the results of M. Vallet-Regi's research team, the storage capacity of the drug being loaded is reduced, especially in the case of silica. Therefore, MOF has been suggested as a solution to this problem. MOF is a material that combines the advantages of large pore volume, regular porosity and easy control of pore size. In this context, adjusting the pore structure and chemical functionality of the MOF can compensate for the shortcomings of currently used carriers, thereby realizing high drug loading, carrier-drug interactions and adequate release rates.

The Patricia Horcajada research team tried to apply the carrier as a carrier that can improve the drug-loading and carrier-drug interaction by adjusting the structure and porosity of the porous organo-metal structure. The research team used porous iron-carboxylate MOFs as nano-sized carriers to encapsulate drugs with different polarities, sizes and various functional groups. The iron-carboxylate MOFs used herein have advantages as carriers because they are non-toxic and biocompatible. In addition, the research team used water or ethanol instead of organic solvents in the process of immersing the MOFs in a solution in which each drug was dissolved to increase the potential for biomedical application.

Meanwhile, a biodegradable polymer refers to a high molecular substance that is transformed into a low molecular weight compound through the participation of an organism's metabolism in a process of decomposition, and its biodegradability can often be accelerated by enzymes present in human skin or other cellular tissues. Biodegradable polymers include natural polymers derived from plants or animals, polymers produced by microorganisms, and synthetic polymers, and representative examples include cellulose, pullulan, polyglutamic acid, polylactic acid, polyvinyl alcohol, polyethylene glycol and polyurethane. Since biodegradable polymers have characteristics such as biocompatibility and biodegradability, they have received much attention in various fields such as biopharmaceuticals, pharmaceuticals and cosmetics as a carrier. As an example of using such a biodegradable polymer, Korean Patent Application Publication No. 10-2014-0098926 discloses a sustained-release formulation in which unstable active ingredients are stabilized by using a biodegradable polymer and the stabilized active ingredients are slowly released, and a cosmetic composition containing the same.

SUMMARY

Technical Problem

Accordingly, the technical problem of the present invention is the provision of a new composite for transdermal delivery which can efficiently deliver an active ingredient into the skin in a stable manner.

In addition, another technical problem of the present invention is the provision of a cosmetic composition comprising the composite for transdermal delivery.

Furthermore, still another technical problem of the present invention is the provision of a method for preparing the composite for transdermal delivery.

Solution to Problem

To solve the above technical problem, the present invention provides a composite for transdermal delivery comprising a metal-organic framework and a triblock copolymer of polyethylene glycol (PEG)-polycaprolactone (PCL)-polyethylene glycol (PEG).

In addition, the present invention provides a cosmetic composition comprising the composite for transdermal delivery.

Furthermore, the present invention provides a method for preparing a composite for transdermal delivery comprising: i) mixing a metal-organic framework solution and a triblock copolymer of polyethylene glycol (PEG)-polycaprolactone (PCL)-polyethylene glycol (PEG) solution; ii) treating the solution obtained in step (i) by stirring or sonication to form a composite; and iii) drying the composite obtained in step (ii); or a method for preparing a composite for transdermal delivery comprising: i) mixing a metal-organic framework solution and a triblock copolymer of polyethylene glycol (PEG)-polycaprolactone (PCL)-polyethylene glycol (PEG) solution; ii) treating the solution obtained in step (i) by sonication and then stirring to form a composite; and iii) drying the composite obtained in step (ii).

The present invention is described in detail hereinafter.

According to one aspect to the present invention, there is provided a composite for transdermal delivery comprising a metal-organic framework and a triblock copolymer of polyethylene glycol (PEG)-polycaprolactone (PCL)-polyethylene glycol (PEG).

In the present invention, as one ingredient of the composite for transdermal delivery, a metal-organic framework (MOF) is comprised.

A metal-organic framework is a three-dimensional crystalline porous material formed by coordination of a secondary structural unit containing a metal ion or a metal cluster and an organic ligand. In the present invention, the metal-organic framework is preferably a zeolite imidazolate framework (ZIF). The zeolite imidazolate framework is composed of transition metal ion (e.g., Fe, Co, Cu or Zn) connected by an imidazolate linker.

In the present invention, the zeolite imidazolate framework is preferably ZIF-8. The ZIF-8 has a structure in which four (4) imidazoles are coordinated to zinc (Zn) ions (FIG. 1).

In the present invention, as one ingredient of the composite for transdermal delivery, a triblock copolymer of polyethylene glycol (PEG)-polycaprolactone (PCL)-polyethylene glycol (PEG) is comprised. In the present invention, a triblock copolymer of polyethylene glycol (PEG)-polycaprolactone (PCL)-polyethylene glycol (PEG) may be synthesized according to methods known in this technical field. For example, diblock copolymers of PEG-PCL may be formed with methoxypoly(ethylene glycol) (mPEG) and ε-caprolactone, and then they are linked to obtain triblock copolymers of PEG-PCL-PEG (FIG. 2).

In the present invention, a triblock copolymer of PEG-PCL-PEG forms a composite with a metal-organic framework to improve the transdermal delivery effect.

In the present invention, preferably 0.01 to 20 parts by weight of the triblock copolymer of PEG-PCL-PEG forms a composite, based on 10 parts by weight of the metal-organic framework. In one embodiment of the present invention, an imine group of the ZIF-8 is combined with the triblock copolymer of PEG-PCL-PEG.

According to one embodiment of the present invention, the composite for transdermal delivery may further comprise an active ingredient. In the present invention, there is no special limitation according to an active ingredient. In the present invention, examples of an active ingredient include, but are not limited to, one or more selected from a moisturizer, a whitening agent, an anti-wrinkle agent, a UV blocking agent, a hair growth promoter, vitamin or a derivative thereof, amino acid or peptide, an anti-inflammatory agent, an acne therapeutic agent, a microbicide, female hormone, a keratolytic agent and a natural product.

Examples of moisturizer include, but are not limited to, creatine, polyglutamic acid, sodium lactate, hydroproline, 2-pyrrolidone-5-carboxyclic acid sodium salt, hyaluronic acid, sodium hyaluronate, ceramide, phytosterol, cholesterol, sitosterol, pullulan and proteoglycan. Examples of whitening agent include, but are not limited to, arbutin and a derivative thereof, kojic acid, bisabolol, niacinamide, vitamin C and a derivative thereof, placenta and allantoin. Examples of anti-wrinkle agent include, but are not limited to, retinol, retinol derivative, adenosine, licorice extract, red ginseng extract and ginseng extract. Examples of UV blocking agent include, but are not limited to, benzophenone derivative, para-aminobenzoic acid derivative, methoxycinnamic acid derivative and salicylic acid derivative. There is no special limitation to a hair growth promoter, but it may be preferably a blood circulation promoter and/or a hair follicle stimulant. Examples of blood circulation promoter include, but are not limited to, the extract of Swertia japonica Makino, cepharanthin, vitamin E and a derivative thereof and gamma-oryzanol, and examples of hair follicle stimulant include, but are not limited to, capsicum tincture, ginger tincture, cantharides tincture and nicotinic acid benzyl ester. Examples of vitamin or a derivative thereof include, but are not limited to, vitamin A (retinol) and a derivative thereof, vitamin B1, vitamin B2, vitamin B6, vitamin E and derivatives thereof, vitamin D, vitamin H, vitamin K, pantothenic acid and derivatives thereof, biotin, panthenol, coenzyme $Q_{10}$ and idebenone. Examples of amino acid or peptide include, but are not limited to, cystine, cysteine, methionine, serine, lysine, tryptophan, amino acid extract, epidermal growth factor (EGF), insulin-like growth factor (IGF), fibroblast growth factor (FGF), copper tripeptide-1, tripeptide-29, tripeptide-1, acetyl hexapeptide-8, nicotinoyl tripeptide-35, hexapeptide-12, hexapeptide-9, palmitoyl pentapeptide-4, palmitoyl tetrapeptide-7, palmitoyl tripeptide-29, palmitoyl tripeptide-1, nonapeptide-7, tripeptide-10 citrulline, sh-polypeptide-15, palmitoyl tripeptide-5, diaminopropionoyl tripeptide-33 and r-spider polypeptide-1. Examples of anti-inflammatory agent include, but are not limited to, beta-glycyrrhetinic acid, glycyrrhetinic acid derivative, aminocaproic acid, hydrocortisone, β-glucan and licorice. Examples of acne therapeutic agent include, but are not limited to, estradiol, estrogen, ethinyl estradiol, triclosan and azelaic acid. Examples of microbicide include, but are not limited to, benzalkonium chloride, benzethonium chloride and halocalban. There is no special limitation to female hormone, but it may be preferably estrogen. As estrogen, it may be preferably estradiol, ethinyl estradiol or isoflavone which is a phytoestrogen. Examples of keratolytic agent include, but are not limited to, sulfur, salicylic acid, AHA, BHA and resorcin. Examples of the extract of natural product or an ingredient obtained therefrom include, but are not limited to, the extract of Japanese witch-hazel, *Lamium album* var. *barbatum, Hedyotis diffusa, Rheum palmatum*, licorice, aloe, chamomile, rose hip, horse chestnut, *ginseng, Luffa aegyptiaca*, cucumber, laver, sea mustard, *Dioscorea batatas*, snail and fruit of *Dioscorea polystachya*, the extract of green tea, or curcumin, hinokitiol and beta-carotene.

In addition, cosmetic ingredients such as oils, waxes, butters, paraffin, higher fatty acids such as stearic acid, esters such as cetyl ethylhexanoate, and silicones may also be used as an active ingredient. Examples of oils include, but are not limited to, olive oil, *camellia* oil, avocado oil, macadamia oil, castor oil, sunflower oil, jojoba oil, almond oil, apricot seed oil, green tea oil, meadowfoam seed oil or argan oil. Examples of waxes include, but are not limited to, carnauba wax, candelilla wax, jojoba oil, beeswax, lanolin, soybean wax, rice wax or silicone wax. Examples of butters include, but are not limited to, shea butter, mango butter, green tea butter or soy butter. Examples of hydrocarbons include, but are not limited to, liquid paraffin, paraffin, petrolatum, ceresin, microcrystalline wax or squalane. Examples of higher fatty acids include, but are not limited to, lauric acid, myristic acid, palmitic acid, stearic acid, isostearic acid, oleic acid, linoleic acid or linolenic acid. Examples of higher alcohols include, but are not limited to, lauryl alcohol, myristyl alcohol, cetyl alcohol, stearyl alcohol, oleyl alcohol or behenyl alcohol. Examples of esters include, but are not limited to, 2-octyldodecyl myristate, cetyl 2-ethyl hexanoate, diisostearyl maleate or cetylethyl hexanoate. Examples of silicones include, but are not limited to, dimethicones, cyclomethicones, silicone polymers or silicone oil.

In addition to the above, yeast extract, collagen, elastin, aluminum sucrose octasulfate, DHA, EPA, flavor ingredient and the like may be used.

According to another aspect of the present invention, there is provided a cosmetic composition comprising the composite for transdermal delivery of the present invention. In the present invention, the cosmetic composition may be formulated to toner, lotion, body lotion, cream, essence and the like, but is not limited thereto.

The cosmetic composition comprises preferably 1 to 60% by weight, more preferably 2 to 50% by weight of the composite for transdermal delivery according to the present invention. In the present invention, if the cosmetic composition comprises the composite for transdermal delivery in an amount of less than 1% by weight, the effect according to an active ingredient may be weak, and if the amount of the composite for transdermal delivery is greater than 60% by weight, it may be economically undesirable since increasing the effect according to an active ingredient commensurately with the added amount would not be expected.

According to still another aspect of the present invention, there is provided a method for preparing a composite for transdermal delivery comprising: i) mixing a metal-organic framework solution and a triblock copolymer of polyethylene glycol (PEG)-polycaprolactone (PCL)-polyethylene glycol (PEG) solution; ii) treating the solution obtained in step (i) by stirring or sonication to form a composite; and iii) drying the composite obtained in step (ii); or a method for preparing a composite for transdermal delivery comprising: i) mixing a metal-organic framework solution and a triblock copolymer of polyethylene glycol (PEG)-polycaprolactone (PCL)-polyethylene glycol (PEG) solution; ii) treating the solution obtained in step (i) by sonication and then stirring to form a composite; and iii) drying the composite obtained in step (ii).

In step (i) of the preparation method, the metal-organic framework solution may be obtained by dissolving a metal-organic framework in a solvent—e.g., distilled water, anhydrous or hydrated lower alcohols having 1 to 5 carbon atoms, or a mixture thereof. The metal-organic framework is preferably a zeolite imidazolate framework (ZIF). In the present invention, the zeolite imidazolate framework is preferably ZIF-8.

In one embodiment of the present invention, ZIF-8 may be prepared by adding dropwise and stirring 2-methylimidazole solution to zinc nitrate hexahydrate solution.

In step (i) of the preparation method, the triblock copolymer of PEG-PCL-PEG solution may be obtained by dissolving a triblock copolymer of PEG-PCL-PEG in a solvent—e.g., distilled water, anhydrous or hydrated lower alcohols having 1 to 5 carbon atoms, or a mixture thereof.

In step (ii) of the preparation method, when the solution obtained by adding the triblock copolymer of PEG-PCL-PEG solution to the metal-organic framework solution is treated by stirring or sonication, or sonication and then stirring, the triblock copolymer of PEG-PCL-PEG and the metal-organic framework are combined to form a composite. In one embodiment of the present invention, an imine group of the ZIF-8 is combined with the triblock copolymer of PEG-PCL-PEG.

In step (iii) of the preparation method, drying of the prepared composite may be carried out, for example, by high-temperature vacuum drying at 60° C. or higher, or freeze-drying. In one embodiment of the present invention, after the drying of the step (iii), a step of washing the prepared composite may be further carried out. The washing of the composite may be carried out, for example, by the use of ethanol.

Effects of Invention

A composite for transdermal delivery according to the present invention can show excellent efficacy even with a small amount of an active ingredient for a long time by efficiently transferring an active ingredient into the skin in a very stable form.

DETAILED DESCRIPTION

Hereinafter, the present invention is explained in more detail with the following examples. However, it must be understood that the protection scope of the present invention is not limited to the examples.

Preparation Example 1: Preparation of ZIF-8

Preparation Example 1-1: Preparation of Zinc Nitrate Hexahydrate Solution 0.4 g of zinc nitrate hexahydrate was completely dissolved in 1.6 g of $H_2O$. At this time, $H_2O$ was used after adjusting to pH 8.0 using NaOH, and sonication was carried out for 5 minutes for complete dissolution. Then, 8 ml of non-ionized $H_2O$ was added and stirred at 300 rpm for 30 minutes.

Preparation Example 1-2: Preparation of 2-Methylimidazole Solution 4.0 g of 2-methylimidazole was completely dissolved in 16.0 g of non-ionized $H_2O$. At this time, sonication was carried out for 30 minutes or more for complete dissolution.

Preparation Example 1-3: Synthesis of ZIF-8

The 2-methylimidazole solution of Preparation Example 1-2 was added dropwise to the zinc nitrate hexahydrate solution of Preparation Example 1-1, and the mixture was stirred at 300 rpm for 30 minutes. Through this process, imidazole bridges were formed in $Zn^{2+}$, and ligands were synthesized to form ZIF-8. The obtained ZIF-8 was washed and dried at 70° C. for 7 hours and 30 minutes.

Preparation Example 1-4: Washing of ZIF-8

After centrifugation twice using distilled water, washing was carried out by centrifugation twice using ethanol. At this time, the conditions of centrifugation were carried out at 4,000 rpm for 15 minutes (Universal 320/Germany).

Preparation Example 2: Preparation of Triblock Copolymer of PEG-PCL-PEG

Polyethylene glycol (PEG)-polycaprolactone (PCL)-polyethylene glycol (PEG) triblock copolymer was prepared by dividing it into two steps. The first step was the formation of a diblock copolymer of methoxypoly(ethylene glycol) (mPEG) and ε-caprolactone (ε-CL), and the second step was the linkage of two diblock copolymer molecules by the use of hexamethylene diisocyanate (HMDI).

Figure 1:
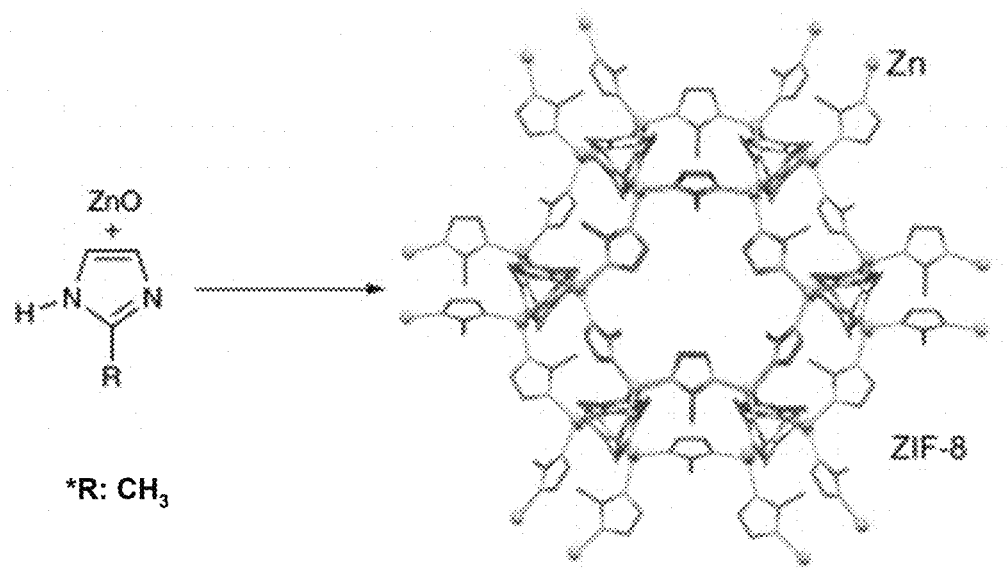
FIG. 1 is a schematic diagram representing the structure of ZIF-8.
Figure 2:
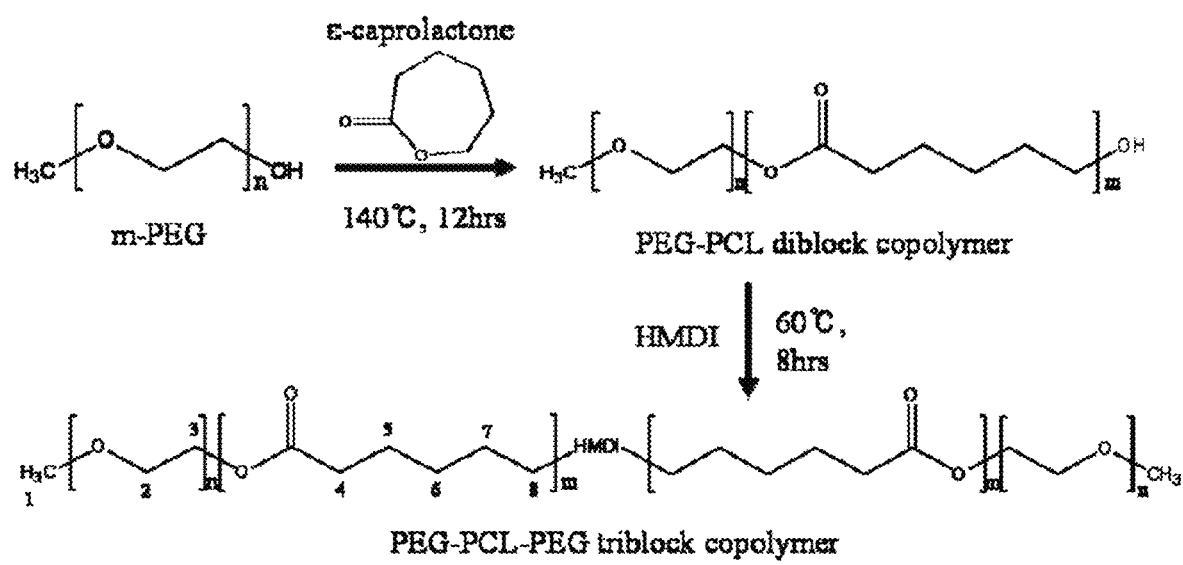
FIG. 2 is a schematic diagram representing the synthetic procedure of a triblock copolymer of PEG-PCL-PEG.

First, after removing residual moisture using a Dean stark trap, 8.06 g of mPEG was completely dissolved in 80 mL of anhydrous toluene for 25 minutes, and then vacuum dried for 3 hours. After that, 4.03 g of E-CL as a monomer and 1.61 g of $SnOct_2$ as a catalyst were added, respectively, and reacted at 140° C. for 14 hours. Then, HMDI was added to the reaction mixture and reacted at 60° C. for 8 hours. The obtained product was isolated in diethyl ether and the residual solvent was removed under vacuum to obtain a PEG-PCL-PEG triblock copolymer. All reactions were carried out under a nitrogen atmosphere. The synthesis schematic of the PEG-PCL-PEG triblock copolymer is shown in FIG. 2. The weight average molecular weight of the synthesized PEG-PCL-PEG triblock copolymer was set to 10,000.

Example 1: Preparation of Composite Via Stirring and High-Temperature Vacuum Drying The 2-methylimidazole solution of Preparation Example 1-2 was added dropwise to the zinc nitrate hexahydrate solution of Preparation Example 1-1, and the mixture was stirred at 300 rpm for 15 minutes. After stirring, the PEG-PCL-PEG triblock copolymer synthesized in Preparation Example 2 prepared as 5% solution in ethanol was added according to the composition recited in Table 1, respectively, followed by stirring at 300 rpm for 15 minutes. After washing, vacuum drying at 70° C. for 7 hours and 30 minutes was carried out.

TABLE 1

|  | Example 1-1 | Example 1-2 | Example 1-3 | Example 1-4 | Example 1-5 |
| --- | --- | --- | --- | --- | --- |
| ZIF-8 solution | 29 ml | 27 ml | 25 ml | 23 ml | 20 ml |
| Triblock copolymer solution | 1 ml | 3 ml | 5 ml | 7 ml | 10 ml |

Example 2: Preparation of Composite Via Sonication and High-Temperature Vacuum Drying The 2-methylimidazole solution of Preparation Example 1-2 was added to the zinc nitrate hexahydrate solution of Preparation Example 1-1, and sonication was carried out at 25° C. for 15 minutes. After sonication, the PEG-PCL-PEG triblock copolymer synthesized in Preparation Example 2 prepared as 5% solution in ethanol was added according to the composition recited in Table 2, respectively, and sonication was then carried out at 25° C. for 15 minutes. After washing, vacuum drying at 70° C. for 7 hours and 30 minutes was carried out.

TABLE 2

|  | Example 2-1 | Example 2-2 | Example 2-3 | Example 2-4 | Example 2-5 |
| --- | --- | --- | --- | --- | --- |
| ZIF-8 solution | 29 ml | 27 ml | 25 ml | 23 ml | 20 ml |
| Triblock copolymer solution | 1 ml | 3 ml | 5 ml | 7 ml | 10 ml |

Example 3: Preparation of Composite Via Sonication and Freeze-Drying

The 2-methylimidazole solution of Preparation Example 1-2 was added to the zinc nitrate hexahydrate solution of Preparation Example 1-1, and sonication was carried out at 25° C. for 15 minutes. After sonication, the PEG-PCL-PEG triblock copolymer synthesized in Preparation Example 2 prepared as 5% solution in ethanol was added according to the composition recited in Table 3, respectively, and sonication was then carried out at 25° C. for 15 minutes. After washing, the obtained composites were frozen at −120° C. for at least 3 hours, and then dried for 2 days.

TABLE 3

|  | Example 3-1 | Example 3-2 | Example 3-3 | Example 3-4 | Example 3-5 |
| --- | --- | --- | --- | --- | --- |
| ZIF-8 solution | 29 ml | 27 ml | 25 ml | 23 ml | 20 ml |
| Triblock copolymer solution | 1 ml | 3 ml | 5 ml | 7 ml | 10 ml |

Example 4: Preparation of Composite Via Stirring and High-Temperature Vacuum Drying after Sonication ZIF-8 prepared as 1% solution in ethanol and the PEG-PCL-PEG triblock copolymer prepared as 1% solution in ethanol were mixed at 50:50 (47 g:47 g), and sonication was carried out for 20 minutes. One sample was stirred at 300 rpm at 25° C. for 17 hours, the other sample was stirred at 300 rpm at 40° C. for 17 hours, and then vacuum dried at 70° C. for 7 hours.

Example 5: Preparation of ZIF-8-Triblock Copolymer Composite Containing Retinol 47 g of ZIF-8 prepared as 1% solution in ethanol, 47 g of the PEG-PCL-PEG triblock copolymer prepared as 1% solution in ethanol and 6 g of retinol were mixed, and sonication was carried out for 20 minutes. Then, the reaction mixture was stirred at 300 rpm at 40° C. for 17 hours and vacuum dried at 70° C. for 7 hours.

Example 6: Preparation of ZIF-8-Triblock Copolymer Composite Containing Plant Natural Product A composite was prepared by the same method as described in Example 5 with the constitutional composition of Table 4.

TABLE 4

| Ingredient | Content (part by weight) |
| --- | --- |
| ZIF-8 | 5 |
| Triblock copolymer | 5 |

TABLE 4-continued

| Ingredient | Content (part by weight) |
| --- | --- |
| Strawberry extract | 20 |
| Distilled water | 20 |

Example 7: Preparation of ZIF-8-Triblock Copolymer Composite Containing Marine Natural Product A composite was prepared by the same method as described in Example 5 with the constitutional composition of Table 5.

TABLE 5

| Ingredient | Content (part by weight) |
| --- | --- |
| ZIF-8 | 8 |
| Triblock copolymer | 8 |
| Sea mustard extract | 20 |
| Distilled water | 22 |

Example 8: Preparation of ZIF-8-Triblock Copolymer Composite Containing Oil

A composite was prepared by the same method as described in Example 5 with the constitutional composition of Table 6.

TABLE 6

| Ingredient | Content (part by weight) |
| --- | --- |
| ZIF-8 | 5 |
| Triblock copolymer | 5 |
| Avocado oil | 1 |
| Olive oil | 3 |
| Camellia oil | 1 |
| Macadamia nut oil | 1 |
| Castor oil | 2 |
| Sunflower oil | 2 |
| Jojoba oil | 2 |
| Almond oil | 1 |
| Meadowfoam seed oil | 2 |
| Argan oil | 2 |
| Distilled water | 40 |

Example 9: Preparation of ZIF-8-Triblock Copolymer Composite Containing Wax

A composite was prepared by the same method as described in Example 5 with the constitutional composition of Table 7.

TABLE 7

| Ingredient | Content (part by weight) |
| --- | --- |
| ZIF-8 | 3 |
| Triblock copolymer | 1 |
| Beeswax | 4 |
| Silicone wax | 4 |
| Distilled water | 32 |

Example 10: Preparation of ZIF-8-Triblock Copolymer Composite Containing Butter A composite was prepared by the same method as described in Example 5 with the constitutional composition of Table 8.

TABLE 8

| Ingredient | Content (part by weight) |
| --- | --- |
| ZIF-8 | 15 |
| Triblock copolymer | 1 |
| Shea butter | 2 |
| Mango butter | 5 |
| Green tea butter | 1 |
| Distilled water | 46 |

Example 11: Preparation of ZIF-8-Triblock Copolymer Composite Containing Paraffin A composite was prepared by the same method as described in Example 5 with the constitutional composition of Table 9.

TABLE 9

| Ingredient | Content (part by weight) |
| --- | --- |
| ZIF-8 | 20 |
| Triblock copolymer | 10 |
| Paraffin | 20 |
| Distilled water | 55 |

Example 12: Preparation of ZIF-8-Triblock Copolymer Composite Containing Higher Fatty Acid A composite was prepared by the same method as described in Example 5 with the constitutional composition of Table 10.

TABLE 10

| Ingredient | Content (part by weight) |
| --- | --- |
| ZIF-8 | 10 |
| Triblock copolymer | 0.5 |
| Stearic acid | 10 |
| Distilled water | 33 |

Example 13: Preparation of ZIF-8-Triblock Copolymer Composite Containing Ester A composite was prepared by the same method as described in Example 5 with the constitutional composition of Table 11.

TABLE 11

| Ingredient | Content (part by weight) |
| --- | --- |
| ZIF-8 | 13 |
| Triblock copolymer | 1.5 |
| Cetyl ethylhexanoate | 20 |
| Distilled water | 48 |

Example 14: Preparation of ZIF-8-Triblock Copolymer Composite Containing Silicone A composite was prepared by the same method as described in Example 5 with the constitutional composition of Table 12.

TABLE 12

| Ingredient | Content (part by weight) |
| --- | --- |
| ZIF-8 | 30 |
| Triblock copolymer | 10 |
| Dimethicone 6CS | 20 |
| Distilled water | 65 |

Example 15: Preparation of ZIF-8-Triblock Copolymer Composite Containing Moisturizer A composite was prepared by the same method as described in Example 5 with the constitutional composition of Table 13.

TABLE 13

| Ingredient | Content (part by weight) |
| --- | --- |
| ZIF-8 | 30 |
| Triblock copolymer | 15 |
| Ceramide 3 | 3 |
| Hyaluronic acid | 0.5 |
| Polyglutamic acid | 1 |
| Distilled water | 70 |

Example 16: Preparation of ZIF-8-Triblock Copolymer Composite Containing Whitening Agent A composite was prepared by the same method as described in Example 5 with the constitutional composition of Table 14.

TABLE 14

| Ingredient | Content (part by weight) |
| --- | --- |
| ZIF-8 | 16 |
| Triblock copolymer | 0.5 |
| Arbutin | 10 |
| Distilled water | 55 |

Example 17: Preparation of ZIF-8-Triblock Copolymer Composite Containing UV Blocking Agent A composite was prepared by the same method as described in Example 5 with the constitutional composition of Table 15.

TABLE 15

| Ingredient | Content (part by weight) |
| --- | --- |
| ZIF-8 | 20 |
| Triblock copolymer | 1.5 |
| Octyl methoxycinnamate | 20 |
| Distilled water | 53 |

Example 18: Preparation of ZIF-8-Triblock Copolymer Composite Containing Vitamin A composite was prepared by the same method as described in Example 5 with the constitutional composition of Table 16.

TABLE 16

| Ingredient | Content (part by weight) |
| --- | --- |
| ZIF-8 | 30 |
| Triblock copolymer | 10 |
| Alpha tocopherol | 10 |
| Distilled water | 78 |

Example 19: Preparation of ZIF-8-Triblock Copolymer Composite Containing Amino Acid A composite was prepared by the same method as described in Example 5 with the constitutional composition of Table 17.

TABLE 17

| Ingredient | Content (part by weight) |
| --- | --- |
| ZIF-8 | 20 |
| Triblock copolymer | 0.1 |
| Fibroblast growth factor (FGF) | 0.01 |
| Epidermal growth factor (EGF) | 0.0001 |
| Insulin-like growth factor (IGF) | 0.001 |
| Distilled water | 55 |

Example 20: Preparation of ZIF-8-Triblock Copolymer Composite Containing Peptide A composite was prepared by the same method as described in Example 5 with the constitutional composition of Table 18.

TABLE 18

| Ingredient | Content (part by weight) |
| --- | --- |
| ZIF-8 | 30 |
| Triblock copolymer | 20 |
| Palmitoyl pentapeptide-3 | 0.0001 |
| Hexapeptide-9 | 0.001 |
| Palmitoyl tetrapeptide-7 | 0.00001 |
| Nonapeptide-7 | 0.0001 |
| Dipeptide-8 | 0.001 |
| Distilled water | 85 |

Example 21: Preparation of ZIF-8-Triblock Copolymer Composite Containing Anti-Inflammatory Agent A composite was prepared by the same method as described in Example 5 with the constitutional composition of Table 19.

TABLE 19

| Ingredient | Content (part by weight) |
| --- | --- |
| ZIF-8 | 10 |
| Triblock copolymer | 1.5 |

TABLE 19-continued

| Ingredient | Content (part by weight) |
|---|---|
| *Centella asiatica* extract (madecassoside) | 15 |
| Distilled water | 40 |

Example 22: Preparation of ZIF-8-Triblock Copolymer Composite Containing Acne Therapeutic Agent A composite was prepared by the same method as described in Example 5 with the constitutional composition of Table 20.

TABLE 20

| Ingredient | Content (part by weight) |
|---|---|
| ZIF-8 | 4 |
| Triblock copolymer | 0.5 |
| Azelaic acid | 10 |
| Distilled water | 38 |

Example 23: Preparation of ZIF-8-Triblock Copolymer Composite Containing Microbicide A composite was prepared by the same method as described in Example 5 with the constitutional composition of Table 21.

TABLE 21

| Ingredient | Content (part by weight) |
|---|---|
| ZIF-8 | 30 |
| Triblock copolymer | 15 |
| Halocalban | 20 |
| Distilled water | 70 |

Experimental Example 1: Cryo-Electron Microscopy

Figure 3:
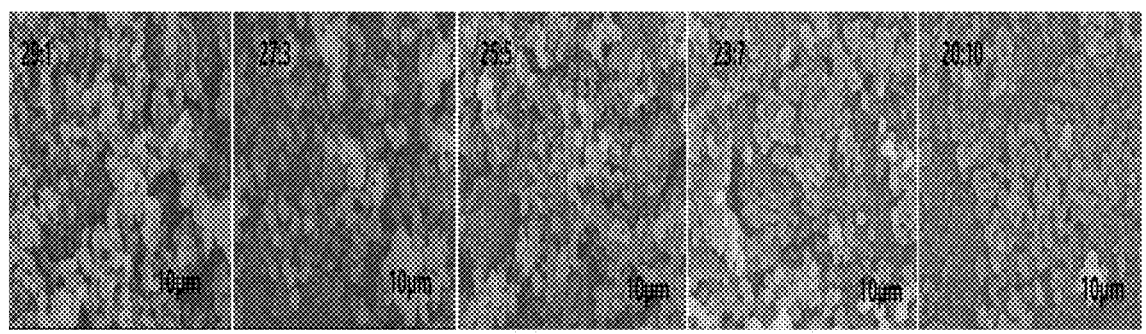
FIG. 3 is cryo-electron microscopy photographs of the ZIF-8-triblock copolymer of PEG-PCL-PEG composite prepared in Example 1.
Figure 4:
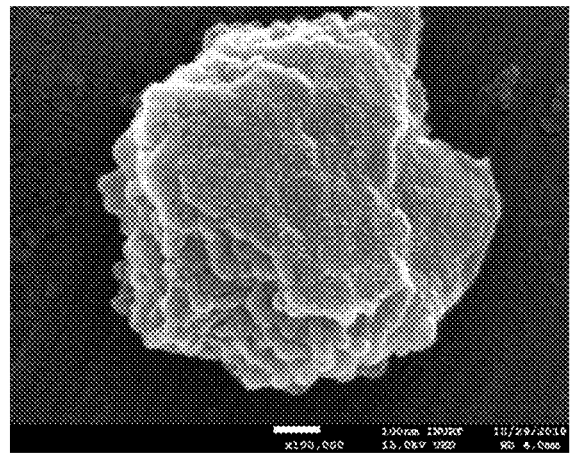
FIG. 4 is cryo-electron microscopy photographs of the ZIF-8-triblock copolymer of PEG-PCL-PEG composite prepared in Example 4 ((a) stirring at 25° C., (b) stirring at 40° C.).
Figure 4:
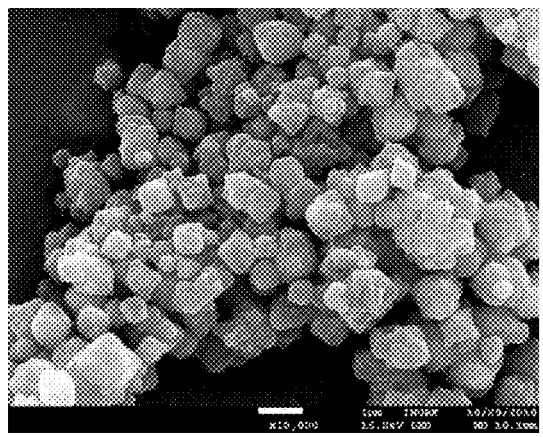

Photographs of the ZIF-8-triblock copolymer composite prepared in Examples 1 and 4 were taken. Due to very fine particle size, it was impossible to take photographs by a general optical microscope. Therefore, cryo-electron microscopy photographs (JEM 1010, JEOL Ltd., Japan) were taken (FIGS. 3 and 4).

Experimental Example 2: Measurement of Particle Size Distribution

Figure 5:
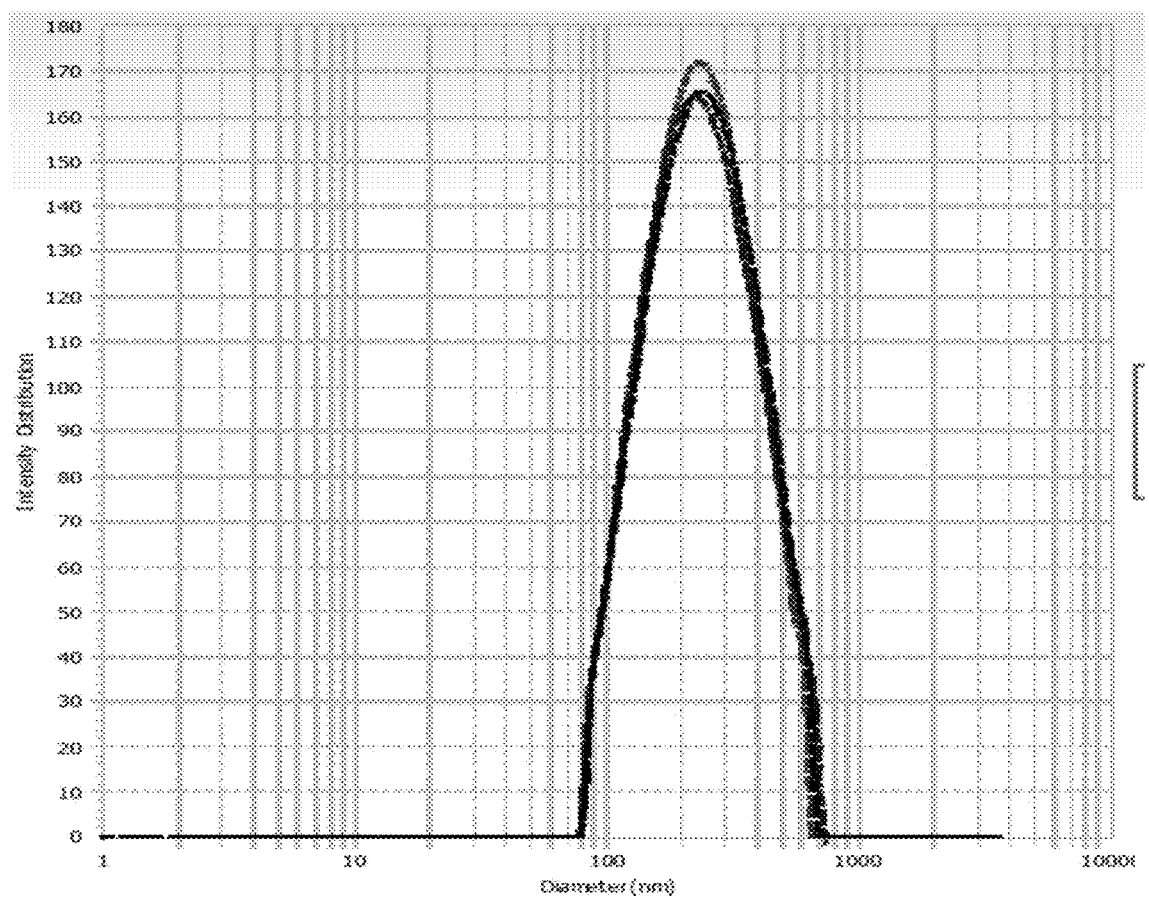
FIG. 5 is a result of measuring the particle diameter of the ZIF-8-triblock copolymer of PEG-PCL-PEG composite by the use of Photal, ELS-Z.

The particle size distribution of the ZIF-8-triblock copolymer composite prepared in Example 1-3 was measured by the use of Photal, ELS-Z, and the result is represented in FIG. 5. From the result of the measurement, it can be known that the average particle size of the composite is 281.8 nm.

Figure 6:
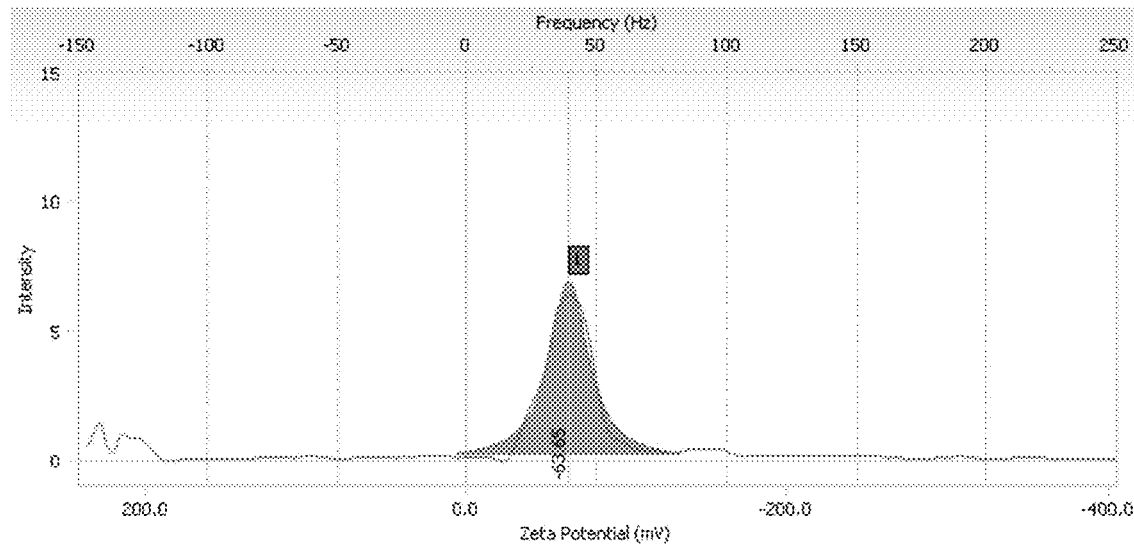
FIG. 6 is a result of measuring zeta potential by the use of Photal, ELS-Z to measure the stability of the ZIF-8-triblock copolymer of PEG-PCL-PEG composite.

Experimental Example 3: Measurement of Stability of ZIF-8-Triblock Copolymer Composite To measure the stability of the ZIF-8-triblock copolymer composite prepared in Example 1-3, zeta potential was measured by the use of Photal, ELS-Z, and the result is represented in FIG. 6. From the result of the measurement, it can be known that the potential of particle is −63.65 mV, and the composite is stable.

Figure 7:
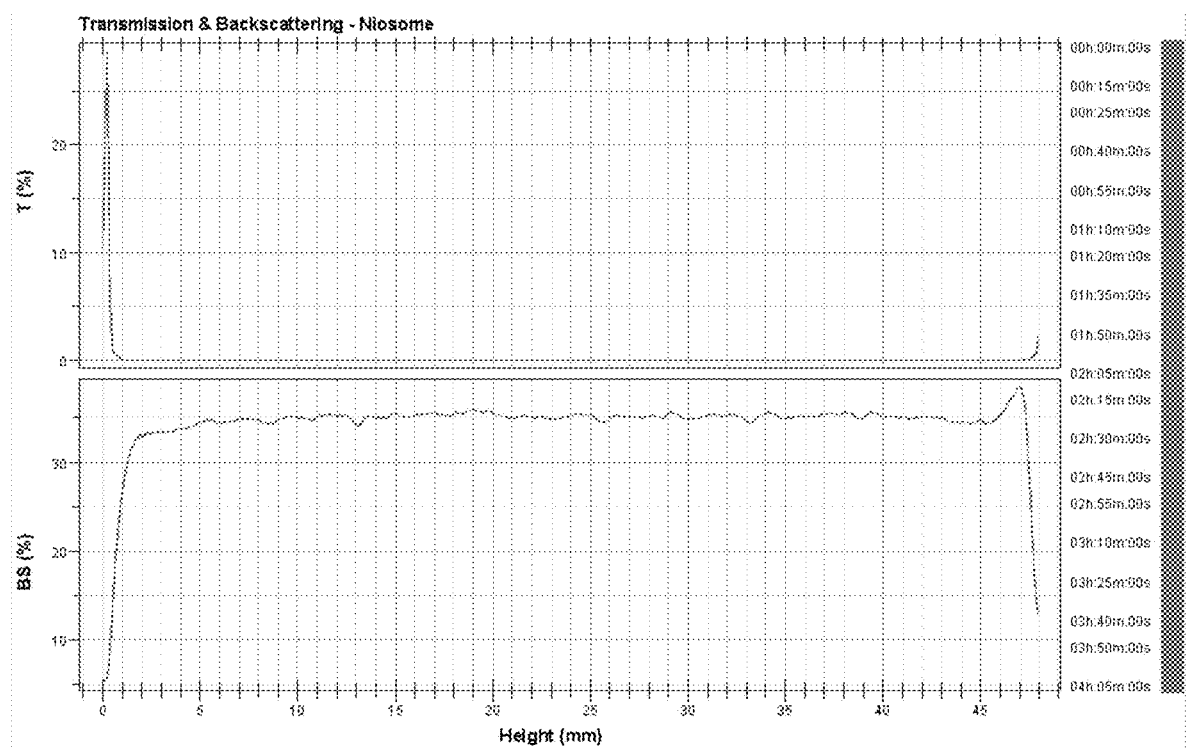
FIG. 7 is a result of measuring the stability of the ZIF-8-triblock copolymer of PEG-PCL-PEG composite by the use of Turbiscan.

Experimental Example 4: Measurement of Stability of ZIF-8-Triblock Copolymer Composite The stability of the ZIF-8-triblock copolymer composite prepared in Example 1-3 was measured by the use of Turbiscan. As a result, the stability of the composite was confirmed since there was little change in ΔT, ΔBS (FIG. 7).

Experimental Example 5: X-Ray Powder Diffraction Test

Figure 8:
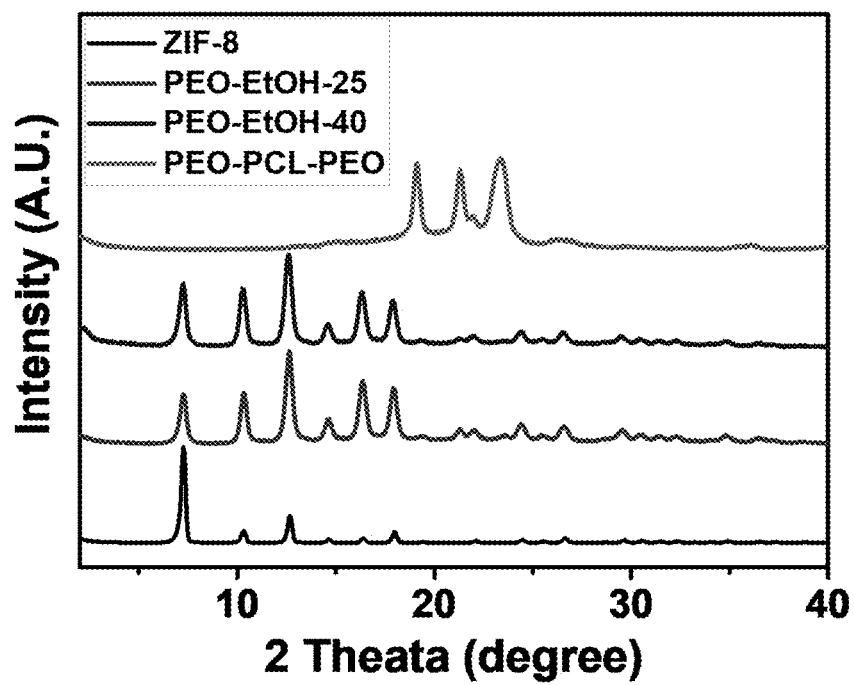
FIG. 8 is X-ray powder diffraction (XRD) spectrums of the ZIF-8 and ZIF-8-triblock copolymer of PEG-PCL-PEG composite containing retinol.

A powder X-ray powder diffraction (XRD) test of the ZIF-8 prepared in the Preparation Example 1 and the ZIF-8-triblock copolymer composite prepared in Example 4 was carried out, and the results are represented in FIG. 8. As can be seen from FIG. 8, it can be known that each of the composites were synthesized well as constant peaks appear.

Experimental Example 6: UV-Visible Spectrophotometry Test

Figure 9:
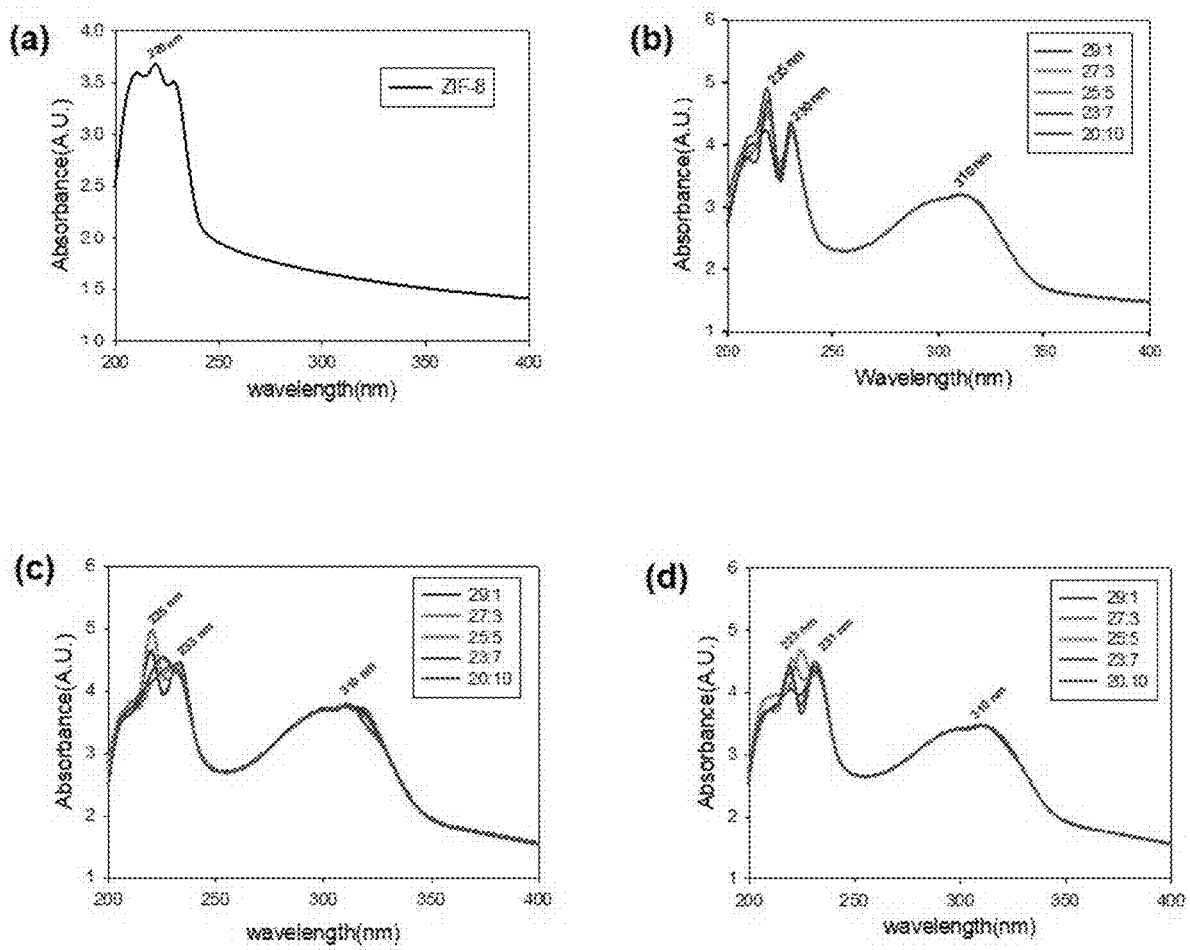
FIG. 9 is results of measuring the ZIF-8-triblock copolymer of PEG-PCL-PEG composites prepared in Examples 1 to 3 by the use of a UV-visible spectrophotometer ((a) ZIF-8, (b) Example 1, (c) Example 2, (d) Example 3).

The results of measuring the ZIF-8 prepared in the Preparation Example and the ZIF-8-triblock copolymer composite prepared in Examples 1 to 3 by UV-visible spectrophotometry are represented in FIG. 9.

Experimental Example 7: Test for Effect of ZIF-8-Triblock Copolymer Composite on Promoting Transdermal Absorption With the constitutional composition recited in Table 22, liposomes having the ZIF-8-triblock copolymer composite containing 10% retinol (Liposome A) and general liposomes (Liposome B) were prepared, respectively.

TABLE 22

| Ingredient | Liposome A | Liposome B |
|---|---|---|
| ZIF-8-triblock copolymer composite containing 10% retinol | 10 | — |
| Saturated lecithin | 3 | 3 |
| Sodium stearoyl glutamate | 0.8 | 0.8 |
| Shea butter | 1 | 1 |
| Macadamia nut oil | 10 | 10 |
| Retinol | — | 1 |
| Distilled water | 75.2 | 84.2 |
| Total amount | 100 | 100 |

(Unit: % by weight)

The artificial skin, Neoderm (Tego Science, Korea) was mounted to a Franz-type diffusion cell (Lab Fine Instruments, Korea). 50 mM phosphate buffer (pH 7.4, 0.1M NaCl) was added to a receptor cell (5 ml) of the Franz-type diffusion cell. A diffusion cell was then mixed and diffused at 600 rpm, 32° C., and 50 μl of Liposome A and Liposome B, respectively, were added to donor cells. Absorption and diffusion were carried out according to the predetermined time, and the area of the skin where the absorption and diffusion were carried out was 0.64 cm². After finishing the absorption and diffusion of the active ingredient, the residues-which were not absorbed and remained on the skin-were cleaned with dried Kimwipes™ or 10 ml of ethanol. The skin in which the active ingredient was absorbed and diffused was homogenized by the use of a tip-type homogenizer, and retinol absorbed into the skin was then extracted with 4 ml of dichloromethane. The extract was then filtrated with a 0.45 μm nylon membrane filter. The content of retinol was measured by high-performance liquid chromatography with the following conditions, and the results are represented in Table 23.

TABLE 23

|  | Transdermal absorption (μg) | Rate of increase |
|---|---|---|
| Liposome A | 0.4540 | 15.87% |
| Liposome B | 0.2860 | — |

A) Column: C18 (4.6 × 200 mm, 5 μm)
B) Mobile phase: methanol:hexane = 2:1
C) Flow rate: 0.8 ml/min
D) Detector: UV 275 nm As can be seen from Table 23, in the present invention retinol—which is encapsulated in the ZIF-8-triblock copolymer composite—can be efficiently delivered into the skin.

What is claimed is:

1. A composite for transdermal delivery comprising a metal-organic framework, a triblock copolymer of polyethylene glycol (PEG)-polycaprolactone (PCL)-polyethylene glycol (PEG), and a cosmetically active ingredient;
    wherein the metal-organic framework is a zeolite imidazolate framework (ZIF)-8;
    wherein the cosmetically active ingredient is one or more selected from the group consisting of a moisturizer, a whitening agent, an anti-wrinkle agent, a UV blocking agent, a hair growth promoter, vitamin or a derivative thereof, amino acid or peptide, an anti-inflammatory agent, an acne therapeutic agent, a microbicide, female hormone, a keratolytic agent and a natural product;
    wherein an imine group of the ZIF-8 is bonded with the triblock copolymer of PEG-PCL-PEG to form the composite for improving a transdermal delivery effect; and
    wherein 0.01 to 20 parts by weight of the triblock copolymer of PEG-PCL-PEG is comprised based on 10 parts by weight of the metal-organic framework.

2. A cosmetic composition comprising the composite for transdermal delivery according to claim 1.

3. The cosmetic composition according to claim 2, which comprises 1 to 60% by weight of the composite for transdermal delivery.

4. A method for preparing a composite for transdermal delivery according to claim 1 comprising:
    i) mixing a metal-organic framework solution, a triblock copolymer of polyethylene glycol (PEG)-polycaprolactone (PCL)-polyethylene glycol (PEG) solution, and a cosmetically active ingredient;
    ii) treating the solution obtained in step (i) by stirring or sonication to form a composite; and
    iii) drying the composite obtained in step (ii);
        wherein the metal-organic framework is a zeolite imidazolate framework (ZIF)-8;
        wherein the cosmetically active ingredient is one or more selected from the group consisting of a moisturizer, a whitening agent, an anti-wrinkle agent, a UV blocking agent, a hair growth promoter, vitamin or a derivative thereof, amino acid or peptide, an anti-inflammatory agent, an acne therapeutic agent, a microbicide, female hormone, a keratolytic agent and a natural product;
        wherein an imine group of the ZIF-8 is bonded with the triblock copolymer of PEG-PCL-PEG to form the composite for improving a transdermal delivery effect; and
        wherein the composite for transdermal delivery comprises 0.01 to 20 parts by weight of the triblock copolymer of PEG-PCL-PEG based on 10 parts by weight of the metal-organic framework.

5. A method for preparing a composite for transdermal delivery according to claim 1 comprising:
    i) mixing a metal-organic framework solution, a triblock copolymer of polyethylene glycol (PEG)-polycaprolactone (PCL)-polyethylene glycol (PEG) solution, and a cosmetically active ingredient;
    ii) treating the solution obtained in step (i) by sonication and then stirring to form a composite; and
    iii) drying the composite obtained in step (ii);
        wherein the metal-organic framework is a zeolite imidazolate framework (ZIF)-8;
        wherein the cosmetically active ingredient is one or more selected from the group consisting of a moisturizer, a whitening agent, an anti-wrinkle agent, a UV blocking agent, a hair growth promoter, vitamin or a derivative thereof, amino acid or peptide, an anti-inflammatory agent, an acne therapeutic agent, a microbicide, female hormone, a keratolytic agent and a natural product;
        wherein an imine group of the ZIF-8 is bonded with the triblock copolymer of PEG-PCL-PEG to form the composite for improving a transdermal delivery effect; and
        wherein the composite for transdermal delivery comprises 0.01 to 20 parts by weight of the triblock copolymer of PEG-PCL-PEG based on 10 parts by weight of the metal-organic framework.

6. The method for preparing a composite for transdermal delivery according to claim 2, wherein the step (iii) is carried out by high-temperature vacuum drying at 60° C. or higher, or freeze-drying.

7. The method for preparing a composite for transdermal delivery according to claim 4, which further comprises a step of washing the composite after the step (iii).

8. The method for preparing a composite for transdermal delivery according to claim 7, wherein the washing is carried out by using ethanol.

9. The method for preparing a composite for transdermal delivery according to claim 5, wherein the step (iii) is carried out by high-temperature vacuum drying at 60° C. or higher, or freeze-drying.

10. The method for preparing a composite for transdermal delivery according to claim 5, which further comprises a step of washing the composite after the step (iii).

11. The method for preparing a composite for transdermal delivery according to claim 10, wherein the washing is carried out by using ethanol.

* * * * *